United States Patent [19]

Bruckdorfer

[11] 4,195,156
[45] Mar. 25, 1980

[54] FLAME RETARDANT COPOLYCARBONATES

[75] Inventor: Roderick A. Bruckdorfer, Lake Jackson, Tex.

[73] Assignee: The Dow Chemical Company, Midland, Mich.

[21] Appl. No.: 951,417

[22] Filed: Oct. 13, 1978

[51] Int. Cl.$^2$ ............................................. C08G 63/62
[52] U.S. Cl. ................................... 528/171; 528/128; 528/166; 528/174; 528/196; 528/198; 528/202
[58] Field of Search .............. 528/171, 196, 166, 128, 528/174, 202; 260/463

[56] References Cited

U.S. PATENT DOCUMENTS

| | | | |
|---|---|---|---|
| 3,043,800 | 7/1962 | Schnell et al. | 260/47 |
| 3,933,734 | 1/1976 | Mark et al. | 260/45.7 S |
| 3,978,024 | 8/1976 | Mark | 260/45.85 T |

*Primary Examiner*—Theodore E. Pertilla
*Attorney, Agent, or Firm*—B. G. Colley

[57] ABSTRACT

Flame retardant, thermoplastic copolycarbonates are made from dihydric aromatic compounds and dihydroxy benzene mono or di sulfonic acids in their alkali metal salt form. The copolycarbonates of this invention are more effective as fire retardants than the alkali metal salts of sulfonated polycarbonates prepared from dihydric aromatic compounds alone.

5 Claims, No Drawings

FLAME RETARDANT COPOLYCARBONATES

BACKGROUND OF THE INVENTION

This invention relates to a flame retardant and moldable copolycarbonates derived from dihydric aromatic compounds and dihydroxy benzene mono or di sulfonic acids in the alkali metal salt form.

It is known from U.S. Pat. No. 3,043,800 dated July 10, 1962 that copolycarbonates can be prepared from dihydric aromatic compounds and dihydroxy benzene sulfonic acids. However, these copolycarbonates are indicated to be only useful as coatings and are soluble in aqueous alkali.

It is also known from U.S. Pat. No. 3,978,024 that homo-polycarbonates can be rendered flame retardant by sulfonation of the polycarbonates followed by neutralization of the sulfonic acid groups with alkali metal hydroxides. However, these sulfonated polycarbonates are not as effective as the copolycarbonates of the present invention as is shown in the examples herein.

SUMMARY OF THE INVENTION

It now has been discovered that flame retardant non-opaque copolycarbonates can be prepared which are useful as moldable or thermoplastic polycarbonates. The copolycarbonates of this invention contain 95 to 99.8 weight percent of monomer units derived from an aromatic dihydroxy compound and 0.01 to 5.0 weight percent, preferably 0.1-1.0 weight percent of monomer units derived from the alkali metal salt of a dihydroxy benzene mono or disulfonic acid.

The copolycarbonates of this invention are transparent, flame resistant, and thermoplastic. The latter property implies they have a molecular weight range from about 25,000 to 60,000 as measured by gel permeation chromatography (G.P.C.)

DETAILED DESCRIPTION

The products of this invention are prepared by first reacting and stirring a carbonyl halide with a dihydric aromatic compound such as bisphenol A or a mixture of dihydric aromatic compounds with an alkali metal salt of a dihydroxy benzene mono or di sulfonic acid in a solvent mixture of pyridine and a halogenated solvent in a manner known in the art as shown by U.S. Pat. No. 3,144,432 dated Aug. 11, 1964.

Suitable dihydroxy benzene sulfonic acid compounds within the scope of this invention are exemplified by 2,5-dihydroxy benzene sulfonic acid, 3,5-dihydroxy benzene sulfonic acid, 2,5-dihydroxy benzene 1,4-disulfonic acid, 2,5-dihydroxy benzene, 1,3-disulfonic acid, and the like.

The alkali metal salts of the above acids are illustrated by the sodium and potassium salts.

The dihydric aromatic compound employed in the practice of this invention are known dihydric aromatic compounds in which the sole reactive groups are the two phenolic hydroxyl groups. Some of these are represented by the general formula

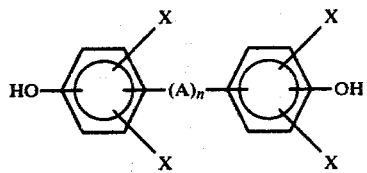

wherein A is a divalent hydrocarbon radical containing 1-15 carbon atoms,

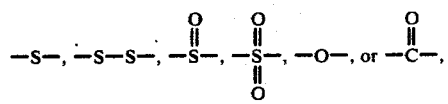

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and n is 0 or 1.

One group of suitable dihydric aromatic compounds are those illustrated below:
1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)chclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3,-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)hexane
2,2-bis(3,5-difluoro-4-hydroxyphenyl)butane
2,2-bis(4-hydroxyphenyl)propane (Bis A)
1,1-bis(3-methyl-4-hydroxyphenyl)ethane
1,1-bis(4-hydroxyphenyl)methane.

Another group of dihydric aromatic compounds useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric aromatic compounds which may be used in the practice of the invention includes the dihydroxyaryl sulfones such as, for example:
bis(3,5-diisopropyl-4-hydroxyphenyl)sulfone
bis(3,5-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric aromatic compounds useful in the practice of the invention includes the dihydroxydiphenyls:
3,3',5,5'-tetrabromo-4,4'-dihydroxydiphenyl
3,3'-dichloro-4,4'-dihydroxydiphenyl
3,3'-diethyl-4,4'-dihydroxydiphenyl 3,3'-dimethyl-4,4'-dihydroxydiphenyl
p,p'-dihydroxydiphenyl.

Another group of dihydric aromatic compounds which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether Other dihydric aromatic compounds of interest include the phthalein type bisphenols which are disclosed in U.S. Pat. Nos. 3,035,021; 3,036,036; 3,036,037; 3,036,038; 3,036,039.

It is, of course, possible to employ a mixture of two or more different dihydric aromatic compounds in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromide, carbonyl chloride and carbonyl fluoride.

The following examples and controls are presented to illustrate but not limit the present invention:

CONTROL A

A copolycarbonate, containing 0.50 wt.% sulfonated monomer, was prepared by condensing Bis A or 2,2-bis(4-hydroxyphenyl)-propane (438.8 g) and 2,5-dihydroxybenzenesulfonic acid, potassium salt, (2.2 g) with phosgene (213.3 g) in the presence of p-tert-butylphenol (8.1 g) and pyridine (511 g) in 2.5 liters of methylene chloride. Upon completion of the reaction, the excess phosgene/pyridine adduct was hydrolyzed with dilute hydrochloric acid. The organic phase was separated, and washed once with dilute acid to convert the potassium salt copolycarbonate to the free acid form, several times with water, and placed over Dowex ®MSC-1 resin to remove trace amount of pyridine. The polymer was precipitated out of solution by the addition of two volumes of heptane to one volume of polymer solution (12% solids) using a laboratory blender to achieve mixing. The finely divided snowy white powder was filtered, washed once with heptane and dried "in vacuo" at 125° C. for 14 hours.

The resultant resin was then injection molded at 302° C. into test bars of 5 in. by ½ in. by ⅛ in. thick. The test bars (5) for each example listed in the table were subject to the test procedure set forth in Underwriters Laboratories, Inc., Bulletin UL-94, titled "Standard for Tests for Flammability of Plastic Materials". In accordance with this test procedure, materials so investigated were rated either V-0, V-1, or V-2, based on the results of 5 specimens. The criteria for each V (for vertical) rating per UL-94 was briefly as follows:

"V-0": Average flamming and/or glowing after removal of the igniting flame shall not exceed 10 seconds and none of the specimens shall drip flamming particles which ignite absorbent cotton.

"V-1": Average flaming and/or glowing after removal of the igniting flame shall not exceed 25 seconds and the glowing does not travel vertically for more than ⅛" of the specimen after flaming ceases and glowing is incapable of igniting absorbent cotton.

"V-2": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-2 and the other four are classified as V-0, then the rating for all 5 bars is V-2. These numerical flame spread ratings are not intended to reflect hazards presented by this or any other material under actual fire conditions.

CONTROL B

Control B was prepared as in Control A except that no potassium salt of 2,5-dihydroxybenzenesulfonic acid was used. Thus Control B is a homopolymer containing Bis A alone.

CONTROL C

A copolycarbonate containing 0.30 wt. % sulfonated monomer was prepared as described in Control A except that 1.3 grams of 2,5-dihydroxybenzenesulfonic acid, potassium salt was used and it was converted to the acid form.

CONTROL D

A copolycarbonate containing 0.10 wt. % sulfonated monomer was prepared as described in Control A except that 0.44 grams of 2,5-dihydroxybenzenesulfonic acid, potassium salt was used and it was converted to the acid form.

CONTROL E

A copolycarbonate containing 0.01 wt. % sulfonated monomer was prepared as described in Control A except that 0.04 grams of 2,5-dihydroxybenzenesulfonic acid, potassium salt was used and it was converted to the acid form.

Controls A–E were tested in accordance with the UL-94 test procedure outlined in Control A. The results and comparisons are set forth in Table I.

TABLE I

| Control or Example | Wt. % Sulfonated Comonomer | 1st Flame Out $t_1$ (seconds) | 2nd Flame Out $t_2$ (seconds) | Rating |
|---|---|---|---|---|
| Control B (Note 1) | 0 | 15.6 | 5.2 | V-2 |
| Control E (Note 2) | 0.01 | 18.0 | 4.4 | V-2 |
| Control D (Note 2) | 0.1 | 16.0 | 3.6 | V-2 |
| Control C (Note 2) | 0.3 | 5.0 | 2.4 | V-0 |
| Control A (Note 2) | 0.5 | 4.0 | 7.2 | V-0 |

NOTES:
1. Unmodified homopolycarbonate.
2. Copolycarbonate in free sulfonic acid form.

These results show that with increasing amounts of the sulfonated comonomer in free acid form the first flame out is greatly reduced and the copolycarbonate is rendered V-0 at 0.3% sulfonated comonomer or greater.

EXAMPLE I

An aromatic copolycarbonate containing 0.01 wt. % of the sodium salt of 2,5-dihydroxybenzenesulfonic acid was prepared as described in Control A except that the polymer solution was neutralized with sodium bicarbonate solution after the dilute HCl wash.

EXAMPLE II

An aromatic copolycarbonate containing 0.10 wt. % of the sodium salt of 2,5-dihydroxybenzenesulfonic acid was prepared as described in Example I.

Examples I and II were tested in accordance with UL-94 as before. The results and comparisons against Control A and Control D are set forth in Table II.

TABLE II

| Control or Example | Wt. % Sulfonated Comonomer | 1st Flame Out $t_1$ (seconds) | 2nd Flame Out $t_2$ (seconds) | Rating |
|---|---|---|---|---|
| Control B (Note 1) | 0 | 15.6 | 5.2 | V-2 |
| Example I (Note 2) | 0.01 | 2.8 | 14.8 | V-2 |
| Example II (Note 2) | 0.1 | 1.2 | 4.4 | V-0 |
| Control D (Note 3) | 0.1 | 16.0 | 3.6 | V-2 |

NOTES:
1. Unmodified homopolycarbonate.
2. Copolycarbonate in sodium salt form.
3. Copolycarbonate in free sulfonic acid form.

These results show that with increasing amounts of the sodium salt of the sulfonated comonomer the first flame out is reduced even more than Table I. The copolycarbonate is rendered V-0 with only 0.1 weight percent of the comonomer in the sodium salt form while the free acid form at the same level (Control D) has a rating of only V-2.

The following Controls F–L were prepared to compare the sulfonated homopolycarbonate in acid form and sodium salt form with the unmodified control and the copolycarbonates of this invention. From a comparison of Table III with Tables I and II it is seen that a much larger amount of the sulfonated homopolycarbonate is generally required. For example, the amount of copolycarbonate in sodium salt from required to give a V-0 rating is one-tenth the amount of the sodium salt form of the sulfonated homopolycarbonate as can be seen from Example II, Table II, and Control L, Table III.

CONTROL F

A sulfonated aromatic polycarbonate containing 0.30 wt. % sulfonated monomer was prepared by condensing 2,2-bis(4-hydroxyphenyl) propane (483.5 g) with phosgene (235 g) in the presence of chlorosulfonic acid (0.4 g), p-tert-butylphenol (8.9 g) and pyridine (562 g) in 2.7 liters methylene chloride. Upon completion of the reaction, the excess phosgene/pyridine adduct was hydrolized with dilute HCl. The organic phase was separated, washed once with dilute HCl, several times with water and placed over Dowex ®MSC-1 resin to remove excess pyridine. The polymer was precipitated by the addition of two volumes of heptane to one volume of polymer solution (13% solids) using a laboratory blender to achieve mixing. The finely divided snowy white powder was filtered, washed once with heptane and dried "in vacuo" at 125° C. for 14 hours. The resultant resin was then injection molded and evaulated as described in Example I.

CONTROL F

A sulfonated aromatic polycarbonate containing 0.30 wt. % sulfonated monomer was prepared by condensing 2,2-bis(4-hydroxyphenyl) propane (483.5 g) with phosgene (235 g) in the presence of chlorosulfonic acid (0.4 g), p-tert-butylphenol (8.9 g) and pyridine (562 g) in 2.7 liters methylene chloride. Upon completion of the reaction, the excess phosgene/pyridine adduct was hydrolized with dilute HCl. The organic phase was separated, washed once with dilute HCl, several times with water and placed over Dowex ®MSC-1 resin to remove excess pyridine. The polymer was precipitated by the addition of two volumes of heptane to one volume of polymer solution (13% solids) using a laboratory blender to achieve mixing. The finely divided snowy white powder was filtered, washed once with heptane and dried "vacuo" at 125° C. for 14 hours. The resultant resin was then injection molded and evaluated as described in Example I.

CONTROL G

A sulfonated aromatic polycarbonate containing 0.50 wt. % sulfonated monomeric unit was prepared as described in Control B using 0.6 g of chlorosulfonic acid.

CONTROL H

A sulfonated aromatic polycarbonate containing 1.20 wt. % sulfonated monomer unit was prepared as described in Control B using 2.6 g of chlorosulfonic acid.

CONTROL I

A sulfonated aromatic polycarbonate containing 2.4 wt. % sulfonated monomeric unit was prepared as described in Control B using 5.2 g of chlorosulfonic acid.

CONTROL J

An aromatic polycarbonate containing 0.01 wt. % of the sodium salt of the sulfonated monomeric unit was prepared as described in Control B except that the polymer solution was neutralized with a sodium bicarbonate solution after the dilute acid wash.

CONTROL K

An aromatic polycarbonate containing 0.10 wt. % of the sodium salt of the sulfonated monomeric unit was prepared as described in Control F.

CONTROL L

An aromatic polycarbonate containing 1.00 wt. % of the sodium salt of the sulfonated monomeric unit was prepared as described in Control F.

TABLE III

| | Polycarbonates containing Sulfonated Bis A in Acid or Sodium Salt Form: | | | |
|---|---|---|---|---|
| Control or Example | Wt. % Sulfonated Bis A | 1st Flame Out $t_1$ (seconds) | 2nd Flame Out $t_2$ (seconds) | Rating |
| Control B (Note 1) | 0 | 15.6 | 5.2 | V-2 |
| Control F (Note 2) | 0.3 | 1.4 | 13.8 | V-2 |
| Control G (Note 2) | 0.5 | 1.8 | 10.01 | V-2 |
| Control H (Note 2) | 1.2 | 15.0 | 4.4 | V-2 |
| Control I | 2.4 | 4.8 | 8.8 | V-2 |

TABLE III-continued

Polycarbonates containing Sulfonated Bis A in Acid or Sodium Salt Form:

| Control or Example | Wt. % Sulfonated Bis A | 1st Flame Out $t_1$ (seconds) | 2nd Flame Out $t_2$ (seconds) | Rating |
| --- | --- | --- | --- | --- |
| (Note 2) | | | | |
| Control J (Note 3) | 0.01 | 3.6 | 8.2 | V-2 |
| Control K (Note 3) | 0.1 | 2.0 | 5.6 | V-2 |
| Control L (Note 3) | 1.0 | 2.2 | 7.6 | V-0 |

NOTES:
1. Unmodified homopolycarbonate.
2. Sulfonated homopolycarbonate in free acid form.
3. Sulfonated homopolycarbonate in sodium salt form.

I claim:

1. A flame retardant non-opaque thermoplastic copolycarbonate comprising 95 to 99.8 weight percent of units derived from an aromatic dihydroxy compound and 0.01 to 5.0 weight percent of units derived from the alkali metal salt of a dihydroxy benzene mono or di sulfonic acid.

2. The copolycarbonate of claim 1 wherein the range of alkali metal salt is 0.1–1.0 weight percent.

3. The copolycarbonate of claim 1 wherein the aromatic dihydroxy compound is 2,2-bis(4-hydroxyphenyl)propane.

4. The copolycarbonate of claim 1 wherein the dihydroxy benzene sulfonic acid is a mono sulfonic acid.

5. The copolycarbonate of claim 4 wherein the dihydroxy benzene sulfonic acid mono sulfonic acid is 2,5-dihydroxy benzene sulfonic acid.

* * * * *